US011475178B2

(12) United States Patent
Stoddart et al.

(10) Patent No.: US 11,475,178 B2
(45) Date of Patent: Oct. 18, 2022

(54) GENERATIVE DESIGN TECHNIQUES FOR AUTOMOBILE DESIGNS

(71) Applicant: AUTODESK, INC., San Rafael, CA (US)

(72) Inventors: James Stoddart, New York, NY (US); David Benjamin, New York, NY (US); Danil Nagy, New York, NY (US); Damon Lau, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 651 days.

(21) Appl. No.: 16/387,527

(22) Filed: Apr. 17, 2019

(65) Prior Publication Data

US 2019/0347382 A1    Nov. 14, 2019

Related U.S. Application Data

(60) Provisional application No. 62/668,736, filed on May 8, 2018.

(51) Int. Cl.
*G06F 30/15* (2020.01)
*B62D 65/00* (2006.01)
*G06F 30/13* (2020.01)
*G06F 30/00* (2020.01)

(52) U.S. Cl.
CPC ............. *G06F 30/15* (2020.01); *B62D 65/00* (2013.01); *G06F 30/00* (2020.01); *G06F 30/13* (2020.01)

(58) Field of Classification Search
CPC ...... G06F 30/00; G06F 2111/04; G06F 30/20; G06F 30/15; G06F 30/17; G06F 30/13; B62D 65/00
See application file for complete search history.

(56) References Cited

U.S. PATENT DOCUMENTS

| 5,297,054 | A  | * | 3/1994 | Kienzle | G06F 30/00 |
| | | | | | 700/182 |
| 2004/0233194 | A1 | * | 11/2004 | Manson | G06T 17/00 |
| | | | | | 345/419 |
| 2005/0159936 | A1 | * | 7/2005 | Rees | G06F 30/17 |
| | | | | | 703/6 |

(Continued)

OTHER PUBLICATIONS

US 11,182,510 B2, 11/2021, Benjamin (withdrawn)*

*Primary Examiner* — Kibrom K Gebresilassie
(74) *Attorney, Agent, or Firm* — Artegis Law Group, LLP (57) ABSTRACT

In various embodiments, a generative design application generates and evaluates automotive designs. In operation, the generative design application computes a first set of metric values based on a set of metrics associated with design goal(s) and a first set of parameter values for a parameterized automobile model. The generative design application then performs optimization operation(s) on the first set of parameter values based on the first set of metric values to generate a second set of parameter values. Subsequently, the generative design application generates at least one design based on the second set of parameter values that is more convergent with respect to at least one of the design goals than a previously generated design. Advantageously, less time and effort are required to generate and evaluate multiple designs and then optimize those designs relative to more manual prior art approaches.

20 Claims, 5 Drawing Sheets

(56) References Cited

U.S. PATENT DOCUMENTS

| | | | |
|---|---|---|---|
| 2011/0098837 A1* | 4/2011 | Yucel | G06F 30/17 700/104 |
| 2012/0221136 A1* | 8/2012 | Yucel | G06F 30/17 700/103 |
| 2016/0147911 A1* | 5/2016 | Bergin | G06F 16/444 703/1 |
| 2017/0024497 A1* | 1/2017 | Lyu | G06F 30/20 |
| 2018/0285517 A1* | 10/2018 | Reichental | G06F 30/17 |
| 2019/0019096 A1* | 1/2019 | Yoshida | G06F 16/9024 |
| 2019/0347373 A1 | 11/2019 | Benjamin et al. | |
| 2019/0347376 A1 | 11/2019 | Stoddart et al. | |
| 2019/0347381 A1 | 11/2019 | Benjamin et al. | |

\* cited by examiner

GENERATIVE DESIGN TECHNIQUES FOR AUTOMOBILE DESIGNS

CROSS-REFERENCE TO RELATED APPLICATIONS

This application claims priority benefit of the United States Provisional Patent Application titled, "GENERATIVE DESIGN TECHNIQUES FOR AUTOMOTIVE DESIGNS," filed on May 8, 2018 and having Ser. No. 62/668,736. The subject matter of this related application is hereby incorporated herein by reference.

BACKGROUND

Field of the Various Embodiments

Embodiments of the present invention relate generally to computer science and automotive technology and, more specifically, to generative design techniques for automobile designs.

Description of the Related Art

In a typical design process for an automobile, designers collect design-related data, interpret the design-related data based on domain expertise, and then synthesize the design-related data, domain expertise, and any number of design goals into a design. The design is subsequently subjected to a wide range of evaluations, such as simulations and qualitative reviews by other designers. Various decisions about different aspects of the design are made based on the evaluations and design goals. The design is then manually modified in view of those decisions. This process of evaluation, decision, and manual modification is iteratively repeated until a resulting design is selected as the ultimate production design.

One drawback of above design process is that the process is typically very labor-intensive and time-consuming because automobile designs are so complex. As a general matter, the amount of time required to perform multiple comprehensive design iterations usually exceeds the amount of time budgeted for design activities. Consequently, to fit into the allocated time budget, designers oftentimes implement a more limited design process that substantially reduces the number of designs and design characteristics that are explored and evaluated. In the more limited design process, the designers choose an initial overall design strategy and subsequently refine that strategy without any validation that the strategy and design space explored are optimized according to the design goals. As a result, the ultimate production design may not be properly optimized. Further, even if the final design is properly optimized, there is no way to know whether the quality of that ultimate production design is greater than the quality of other feasible designs that were not explored during the more limited design process using a far more limited design space.

As the foregoing illustrates, what is needed in the art are more effective techniques for generating and evaluating automobile designs.

SUMMARY

One embodiment of the present invention sets forth a computer-implemented method for generating and evaluating automotive designs. The method includes computing a first set of metric values based on a set of metrics associated with one or more design goals and a first set of parameter values for a parameterized automobile model; performing one or more optimization operations on the first set of parameter values based on the first set of metric values to generate a second set of parameter values; and generating at least one design based on the second set of parameter values that is more convergent with respect to at least one of the design goals than a previously generated design.

At least one technical advantage of the disclosed techniques relative to the prior art is that, with the disclosed techniques, an optimized production design for an automobile can be automatically generated based on any number of design goals. Further, with the disclosed techniques, less time and effort are required to generate and evaluate multiple designs and then optimize those designs relative to more manual prior art approaches. Consequently, a far greater overall design space can be explored within the time frames typically budgeted for automotive design phases. Accordingly, the likelihood that resulting production designs are properly optimized is increased, and the confidence in those designs being properly optimized also is increased. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
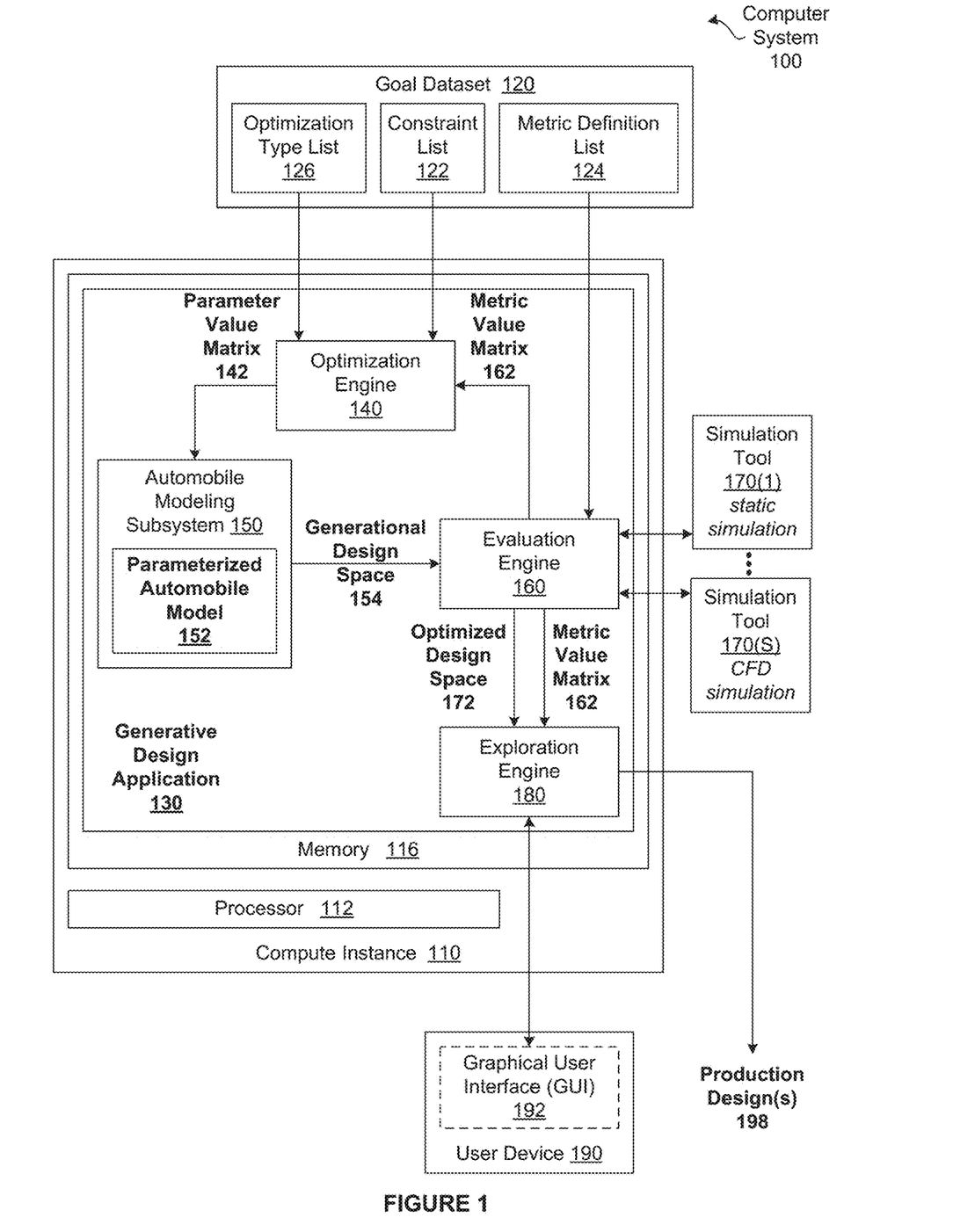
FIG. 1 is a conceptual illustration of a computer system configured to implement one or more aspects of the present invention.

FIG. 1 is a conceptual illustration of a computer system 100 configured to implement one or more aspects of the present invention. As shown, the computer system 100 includes, without limitation, a compute instance 110, any number of simulation tools 170, a user device 190, and a goal dataset 120. In alternate embodiments, the computer system 100 may include any number and types of any of the compute instance 110 and the user devices 190 in any combination. For explanatory purposes, multiple instances of like objects are denoted with reference numbers identifying the object and parenthetical numbers identifying the instance where needed. In some embodiments, any number of the components of the computer system 100 may be distributed across multiple geographic locations or included in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a microcontroller, a state machine, or any combination thereof.

The memory 116 stores content, such as software applications and data, for use by the processor 112 of the compute instance 110. The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory ("CD-ROM"), an optical storage device, a magnetic storage device, or any suitable combination of the foregoing.

In alternate embodiments, each of any number (including one) of the compute instances 110 may include, without limitation, any number of processors 112 and any number of memories 116 in any combination. In particular, any number of the compute instances 110 may provide a multiprocessing environment in any technically feasible fashion.

In general, the compute instance 110 is configured to implement one or more applications. Each application is described as residing in the memory 116 of a single compute instance 110 and executing on a processor 112 of the single compute instance. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instance 110 is configured to generate designs for an automobile. In a typical conventional design process for an automobile, designers synthesize design-related data, domain expertise, and any number of design goals into a design. Various decisions about different aspects of the design are made based on evaluations of the design and the design goals. The design is then manually modified in view of those decisions. This process of evaluation, decision, and manual modification is iteratively repeated until a resulting design is selected as the ultimate production design.

One drawback of above design process is that the process is typically very labor-intensive and time-consuming because automobile designs are so complex. As a general matter, the amount of time required to perform multiple comprehensive design iterations usually exceeds the amount of time budgeted for design activities. Consequently, to fit into the allocated time budget, designers oftentimes implement a more limited design process that substantially reduces the number of designs and design characteristics that are explored and evaluated. Because the design process and design space are so limited, there is no way to know whether the quality of that ultimate production design is greater than the quality of other feasible designs that were not explored.

Implementing a Generative Design Process for Automobiles

To address the above problems, the compute instance 110 includes, without limitation, a generative design application 130. The generative design application 130 resides in the memory 116 and executes on the processor 112 of the compute instance 110. In general, the generative design application 130 implements an iterative, multi-objective, generative design process to automatically generate an optimized design space 172 based on a goal dataset 172 that represents one or more design goals. As referred to herein, a "design space" may include any amount and type of data that describes and/or is associated with any number of designs. Accordingly, a design space is referred to herein as including any number of designs and, alternatively, "a design space of designs." The generative design application 130 then facilitates exploration of the optimized design space 172 to determine one or more production design(s) 198.

In general, the goal dataset 120 may define any number and type of goals associated with any aspect of automotive design. For instance, in some embodiments, the goal dataset 120 may include different goals for performance, body design, chassis design, interior design, exterior styling, aerodynamics, crash criteria, manufacturability, cost, etc. The goal dataset 120 includes, without limitation, a constraint list 122, a metric definition list 124, and an optimization type list 126. The constraint list 122 is associated with a parameterized automobile model 152. The parameterized automobile model 152 may be any type of model that parameterizes a set of structural components in the structural system of an automobile in any technically feasible fashion. In various embodiments, the parameterized automobile model 152 may specify a functional design hierarchy of instances of parameterized components. For example, the parameterized automobile model 152 could include, without limitation, an instance of a powertrain parameterized component, and the instance of the powertrain parameterized component could include, without limitation, a sub-instance of a drivetrain parameterized component and a sub-instance of an engine parameterized component.

The constraint list 122 includes, without limitation, a fixed parameter list (not shown in FIG. 1) and a variable parameter list (not shown in FIG. 1). Each entry in the fixed parameter list specifies a fixed parameter value for a parameter associated with a parameterized automobile model 152. Each entry in the variable parameter list specifies acceptable parameter values (including "any") for a parameter associated with the parameterized automobile model 152 in any technically feasible fashion. Notably, any two parameter values may be associated with different instances of different parameterized components that may be at different levels in a functional design hierarchy. The union of the parameters specified in the fixed parameter list and the parameters specified in the variable parameter list is referred to here as the "set of parameters." In general, the set of parameters may be any portion of possible parameters associated with the parameterized automobile model 152.

Notably, in various embodiments, the parameterized automobile model 152 includes hierarchically defined parameters, and the set of parameters associated with the constraint list 122 inherently specifies a parameterization level for each of the structural components of the automobile. For instance, in some embodiments, to parameterize the chassis at a relatively high level, the fixed parameter list could specify fixed parameter values for the suspension stroke, camber angles, and toe angles. In other embodiments, to parameterize the chassis at a relatively low level, the variable parameter list could specify ranges for each of the suspension stroke, camber angles, and toe angles.

The parameters included in the parameter set may be associated with any level of detail that is consistent with the parameterized automobile model 152. Further, the allowed parameter values may be defined in any technically feasible fashion. For example, the variable parameter list could specify that the allowed parameter values for a drive train parameter are front wheel drive and rear wheel drive, the allowed parameter values for a propulsion system parameter are electric and gas, the allowed parameter values for a wheelbase parameter range from 100"-200" (inclusive), etc. In another example, the fixed parameter list could specify that the parameter value for the drive train parameter is four-wheel drive, the parameter value for the propulsion system parameter is gas, etc.

The metric definition list 124 includes, without limitation, any number of design metrics (not shown in FIG. 1), where each design metric may represent any type of information associated with the automobile. For instance, in some embodiments, the design metrics include, without limitation, structural metrics (e.g., mass), performance-related metrics (e.g., driving dynamics), and program management metrics (e.g., cost, part availability, manufacturing time, etc.). Each design metric includes a metric name and a metric definition that describe the design metric. The metric definition may be specified in any technically feasible fashion based on any amount and type of data associated with designs generated by the parameterized automobile model 152. For instance, in some embodiments, the metric definitions may be specified using any combination of equations, executable software applications (e.g., a cost engine, a multi-physics analysis engine, the simulation tools 170, etc.), scripts written in a scripting language, and so forth.

Each design metric may be associated with any number and type of design goals and/or constraints in any technically feasible fashion. In particular, each metric definition may define the associated design metric based on any number (including one) of scores derived from any amount and type of design data, simulation measurements, other design metrics, and/or any number of constituent metrics. For example, a mass design metric could be defined as a single value that is the total mass of the automobile. In another example. a driving performance design metric could be a single value that is a function of local stiffness and local stress simulation measurements.

For explanatory purposes only, metrics that are not defined as design metrics, but are used to compute design metrics are referred to herein as "constituent metrics." In various embodiments, each constituent metric may be associated with a metric definition that defines the constituent metric. In alternate embodiments, a metric definition may define a "multi-metric target zone" design metric that defines upper and lower bounds of a target performance zone based on functions of multiple design metrics or constituent metrics. In such embodiments, the metric value of the design metric represents the distance between the associated design and the target performance zone.

The optimization type list 126 includes, without limitation, a different optimization type (not shown in FIG. 2) for each design metric included in the metric definition list 124. The optimization type for a design metric specifies a goal for the design metric in any technically feasible fashion. For instance, in some embodiments, each of the optimization types is equal to minimize, maximize, pass/fail, minimize within range, or maximize within range. In other embodiments, each of the optimization type may specify one or more of minimize, maximize, a range, and a Boolean associated with a pass/fail condition.

In alternate embodiments, the optimization type may specify any optimization criteria based on any number of design metrics of constituent metrics in any technically feasible fashion that is consistent with the optimization algorithm(s) implemented as part of the generative design process. In such embodiments, the number of optimization types included in the optimization type list 126 is not necessarily equal to the number of design metrics included in the metric definition list 124. The goal dataset 120, the constraint list 122, the metric definition list 124, and the optimization type list 126 are described in greater detail in conjunction with FIG. 2.

As shown, the generative design application 130 includes, without limitation, an optimization engine 140, an automobile modeling subsystem 150, an evaluation engine 160, and an exploration engine 180. In operation, the optimization engine 140, the automobile subsystem 150, and the evaluation engine 160 iteratively execute a generative design process that repeatedly regenerates a generational design space 154 until the evaluation engine 160 determines to stop iterating based on any number of termination criteria. The evaluation engine 160 then transmits the final generational design space 154 to the exploration engine 180 as the optimized design space 172. The exploration engine 180 facilitates the exploration of the optimized design space 172 based on the design goals to determine the production design(s) 198.

To initiate the first iteration, the optimization engine 140 generates a parameter value matrix 142 based on the constraint list 122 included in the goal dataset 120. The parameter value matrix 142 includes, without limitation, any number of sets of parameter values for the set of parameters specified in the constraint list 122. For example, if the constraint list 122 specifies N fixed parameters and M variable parameters, then each set of parameter values includes, without limitation, (N+M) parameter values. Each set of parameter values defines a different design for the automobile based on the parameterized automobile model 152.

In general, the generative design application 130 may be configured to generate any number of sets of parameters for each iteration in any technically feasible fashion. For example, the generative design application 130 could be configured to generate ten thousand sets of parameters for each iteration based on input received via an application programming interface ("API"). In alternate embodiments, the sets of parameter values may be specified in any technically feasible fashion instead of as the parameter value matrix 142.

The automobile modeling subsystem 150 generates the generational design space 152 based on the parameter value matrix 142. As shown, the automobile modeling subsystem 150 includes, without limitation, the parameterized automobile model 152. For each set of parameter values included in the parameter value matrix 142, the automobile modeling subsystem 150 generates a different design based on the set of parameter values and the parameterized automobile model 152. As part of generating the design, the automobile modeling subsystem 150 may generate any number and type of representations of any portions of the design and any amount and type of additional design data associated with any portions of the design. The generational design space 152 is associated with an iteration and includes, without limitation, the representations and the design data associated with each of the designs generated based on the parameter value matrix 142 associated with the iteration. In various embodiments, the generational design space 152 also includes the set of parameter values for each of the designs.

In particular, the automobile modeling subsystem 150 generates representations and design data to enable the evaluation engine 160 to compute values for the design metrics. In some embodiments, representations may include, without limitation, any number of computer-aided design ("CAD") geometry model (not shown in FIG. 1) and any number of simulation meshes (not shown). As referred to herein, a CAD geometry model specifies the geometry of the design in a format that is suitable for manufacturing, while a simulation mesh enables efficient simulation of at least a portion of the design via one or more of the simulation tools 170.

Examples of CAD geometry models include, without limitation, a partial wire-frame model, a surface model, etc. Examples of simulations include, without limitation, a computational fluid dynamics ("CFD") simulation, a dynamic simulation, a static simulation, a thermal simulation, a stress analysis simulation, a vibration simulation, etc. Examples of design data that the evaluation engine 160 may generate include, without limitation, cost data, scheduling data, part procurement data, etc. Notably, the associated portion of the design may vary across the representations and the design data. Further, the level-of-detail associated with each structural component of the automobile may vary within and across representations and design data.

The evaluation engine 160 generates the metric value matrix 162 based on the generational design space 152, the metric definition list 124, and any number of the simulation tool(s) 170. For each of the designs included in the generational design space 152, the metric value matrix 162 includes a set of metric values for the set of design metrics. In alternate embodiments, the sets of metric values may be specified in any technically feasible fashion instead of as the metric value matrix 162.

In operation, for each of the designs included in the generational design space 152, the evaluation engine 160 computes the metric value for each of the design metrics based on the associated representations and the associated design data in any technically feasible fashion. As described previously herein, each of the design metrics is defined via an associated metric definition. Further, each of the metric definitions may define the associated design metric based on other design metrics and/or constituent metrics.

Notably, as part of computing metric values, the evaluation engine 160 may configure any number of the simulation tools(s) 170 to execute any number and type of simulations based on the representations included in the generational design space 152. Further, the evaluation engine 160 may compute the metric values for any number of constituent metrics. In general, the evaluation engine 160 may store any number and type of results (e.g., simulation results, metric values for constituent metrics) as additional design data in the generational design space 152.

After the evaluation engine 160 generates the metric value matrix 162, the evaluation engine 160 determines whether the current iteration is the final iteration based on any number and type of termination criteria (not shown). The termination criteria may be specified in any technically feasible fashion. For example, the termination criteria could specify a maximum number of iterations (e.g., 500) and/or a performance target for each of the metric values. The evaluation engine 160 may evaluate the metric value matrix 162 and/or any additional information (e.g., the total number of iterations) in conjunction with the termination criteria in any technically feasible fashion to determine whether the current iteration is the final iteration.

If the evaluation engine 160 determines that the current iteration is not the final iteration, then the evaluation engine 160 transmits the metric value matrix 162 to the optimization engine 140. In alternate embodiments, the evaluation engine 160 may also transmit any amount of additional design data to the optimization engine 160. To initiate each subsequent iteration, the optimization engine 140 executes a multi-objective optimization algorithm based on the metric value matrix 162, the optimization type list 126, the parameter value matrix 142, and the constraint list 122 to generate a new parameter value matrix 142. For instance, in some embodiments, the optimization engine 140 implements a metaheuristic search algorithm, such as the multi-objective non-dominated sorting genetic algorithm-II ("NSGA-II") to optimize each of the design metrics simultaneously and independently. As part of the generating the new metric value matrix 162, for each parameter included in the variable parameter list, the optimization engine 140 determines a new parameter value from the acceptable parameter values and includes the new parameter value in the new parameter value matrix 142.

In alternate embodiments, the optimization engine 140 may execute any number and type of optimization operations based on the metric value matrix 162, the optimization type list 126, the parameter value matrix 142, and the constraint list 122 to generate the new metric value matrix 162. For instance, in some alternate embodiments, the optimization engine 140 may perform optimization operations that evaluate and optimize different design metrics in combination based on a function of the design metrics, thereby optimizing the design metrics in a coupled fashion.

The functionality of the automobile modeling subsystem 150 does not vary between the initial iteration and subsequent iterations. The functionality of the evaluation engine 160 does not vary between the initial iteration and subsequent iterations until the evaluation engine 160 determines that the current iteration is the final iteration. If the evaluation engine 160 determines that the current iteration is the final iteration, then the evaluation engine 160 transmits the generational design space 152 to the exploration engine 180 as the optimized design space 172. The evaluation engine 160 also transmits the metric value matrix 162 to the exploration engine 180.

The exploration engine 180 facilitates the exploration of the optimized design space 172 to determine the production design(s) 198. As shown, the exploration engine 180 generates a graphical user interface (GUI) 192 and displays the GUI 192 on the user device 190. The user device 190 may be any type of device that is capable of transmitting input data and/or displaying visual content. For example, the user device 190 could be a game console, a smartphone, a smart television (TV), a laptop, a tablet, or a desktop computer.

The exploration engine 180 may include, without limitation, any number of data visualization tools, filtering tools, sorting tools, plotting tools, etc. In a complementary fashion, the GUI 192 may include, without limitation, any number and type of display widgets (e.g., sliders, menus, panes, etc.) that provide input to and display data from the exploration engine 180. In general, the GUI 192 enables the designer to efficiently explore the designs included in the optimized design space 172 based on the representations (e.g., the CAD geometry models), the design metrics, design data, and any number of additional criteria.

For instance, in some embodiments, the GUI 192 enables the designer to filter the designs in the optimized design space 172 based on a weighted combination of the design metrics. In various embodiments, the exploration engine 180 displays the CAD geometry model for any number of the designs included in the optimized design space 172 at any level of granularity and in any technically feasible fashion (e.g., hierarchical images, thumbnails, etc). Accordingly, the designer may compare any number of designs side-by-side based on both aesthetic criteria and any number of the design metrics. In various embodiments, the exploration engine 180 enables the designer to compare the time required to procure parts for different designs based on metric values for a part availability design metric.

The designer may select any number of the designs included in the optimized design space 172 as the production design(s) 198 via the GUI 192 and/or the exploration engine 180 in any technically feasible fashion. Subsequently, for each of the production designs 198(s), the exploration engine 180 transmits a least one CAD geometry model representing the production design 198 to any number of software applications for additional design and/or manufacturing activities. The exploration engine 180 and/or the generative design application 130 may also transmit any number and type of additional representations, amount and type of design data, and amount and type of additional data associated with the production design(s) 198 to software application(s) for further design and/or manufacturing activities. More detailed examples of the GUI 192 are described in conjunction with FIGS. 4 and 5.

In alternate embodiments, any representations and design data associated with any number and type of designs may be computed by any software application in any technically feasible fashion. For instance, in some embodiments, the automobile modeling subsystem 150 does not store simulation meshes in the generational design space 152. To compute metric values based on simulation results, the evaluation engine 160 interacts with the automobile modeling subsystem 150 to generate the appropriate simulation meshes based on the parameter value matrix 142. After performing the simulations, the evaluation engine 160 does not store simulation results as design data in the generational design space 152. To enable the designer to view a particular simulation result for a particular design, the exploration engine 180 interacts with the automobile modeling subsystem 150 to regenerate the associated simulation mesh based on the set of parameter values for the design. The exploration engine 180 then interacts with the evaluation engine 160 or the simulation tool 170 to generate the simulation result.

In the same or other alternate embodiments, the exploration engine 180 enables the designer to explore the generational design spaces 152 associated with intermediate iterations. Among other things, exploring the generational design spaces 152 associated with intermediate iterations enables the designer to validate that the quality of the designs improved as the generative design application 130 iterated.

Advantageously, because the generative design application 130 automatically generates, evaluates, and optimizes designs based on the goal dataset 120, a far greater overall design space can be explored within the time frames typically budgeted for automotive design phases. Consequently, the likelihood that the production designs(s) 198 are properly optimized is increase, and the confidence in those design being properly increased.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. In particular, the functionality of the generative design application 130, the optimization engine 140, the automobile modeling subsystem 150, the evaluation engine 160, and the exploration engine 180 may be implemented in any number of software applications in any combination. In alternate embodiments, the goal dataset 120 may be omitted from the system 100, and the design goals (including any number of constraints, design metrics, and optimization criteria) may be defined in any technically feasible fashion. Further, in various embodiments, any number of the techniques disclosed herein may be implemented while other techniques may be omitted in any technically feasible fashion. As a general matter, the techniques outlined herein are applicable to performing a generative design process based on a parameterized model of an automobile and any number of design goals to generate any number of optimized designs.

Figure 2:
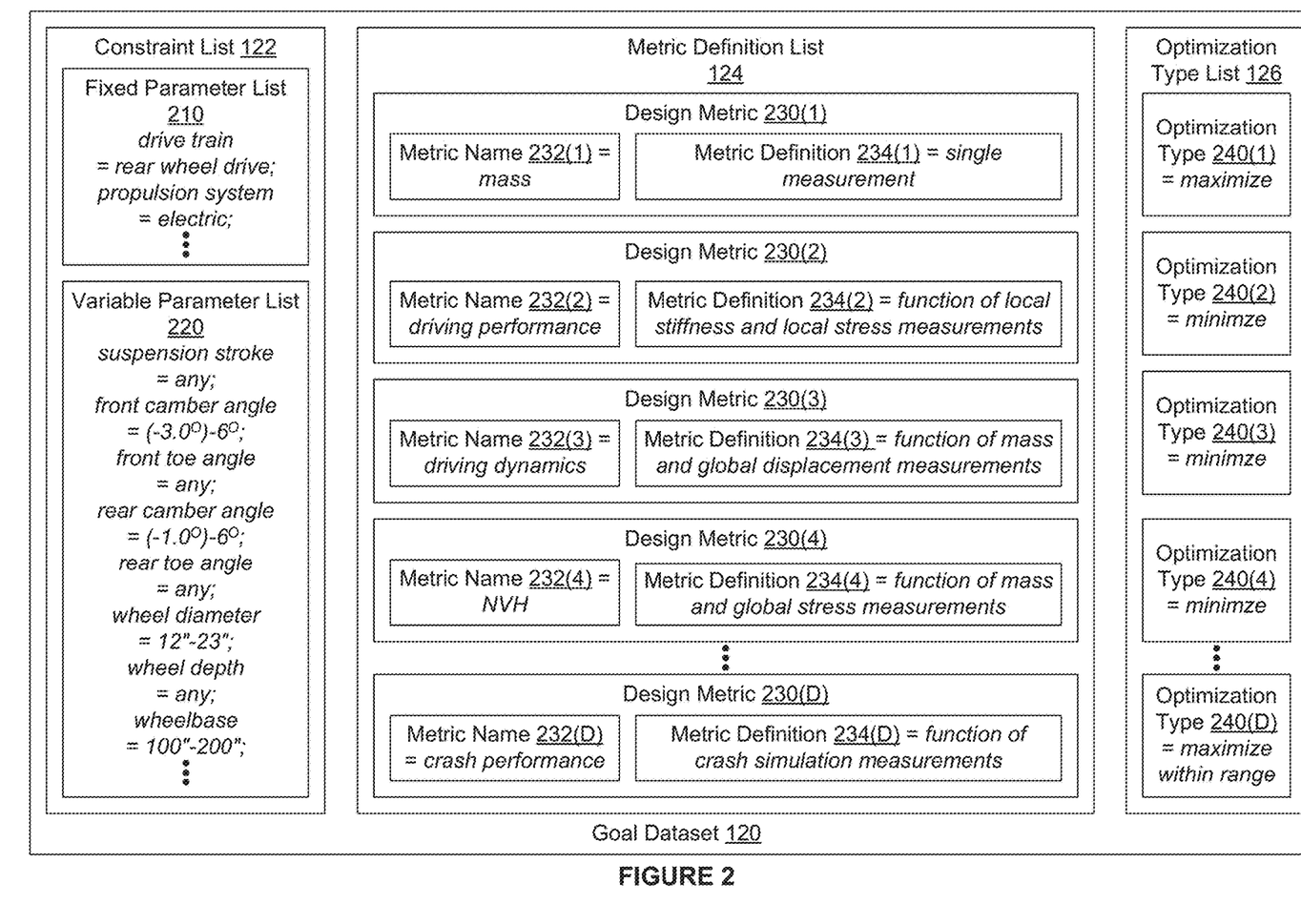
FIG. 2 is a more detailed illustration of the goal dataset of FIG. 1, according to various embodiments of the present invention.

FIG. 2 is a more detailed illustration of the goal dataset 120 of FIG. 1, according to various embodiments of the present invention. As shown, the goal dataset 120 includes, without limitation, the constraint list 122, the metric definition list 124, and the optimization type list 126. For explanatory purposes only, FIG. 2 depicts italicized exemplary values included in an example of the goal dataset 120.

As shown, the constraint list 122 includes, without limitation, a fixed parameter list 210 and a variable parameter list 220. Each entry in the fixed parameter list 210 specifies a fixed parameter value for a different parameter associated with the parameterized automobile model 152. The fixed parameter list 210 may be specified in any technically feasible fashion and in any technically feasible format. As depicted, an example of the fixed parameter list 210 is "drive train=rear wheel drive; propulsion system=electric; . . . "

The optimization engine 140 may configure the parameterized automobile model 152 to implement the fixed parameter values in any technically feasible fashion. For instance, in some embodiments, the optimization engine 140 includes the fixed parameter values in the parameter value matrix 142. In other embodiments, the optimization engine 140 may transmit the fixed parameter values to the automobile modeling subsystem 150 in any technically feasible fashion.

Each entry in the variable parameter list 220 specifies allowed parameter values for a different parameter associated with the parameterized automobile model 152. The variable parameter list 220 may be specified in any technically feasible fashion and in any technically feasible format. For instance, in some embodiments, the allowed parameter values may be specified as "any," a range of parameter values, a list of parameter values, etc. As depicted, an example of the variable parameter list 220 is suspension stroke=any; front camber angle=(−3.0°)–6°; front toe angle=any; rear camber angle=(−1.0°)−6°; rear toe angle=any; wheel diameter=12"-23"; wheel depth=any; wheelbase=100"-200"; . . . "

For each iteration, for each of the parameters specified in the variable parameter list 220, the optimization engine 140 determines a parameter value from the allowed parameter values and includes the parameter value in the parameter value matrix 142. For the initial iteration, the optimization engine 140 may determine the parameter values in any technically feasible fashion. For instance, the optimization engine 140 may randomly select each parameter value from the associated allowed parameter values. Subsequently, the optimization engine 140 performs any number and type of optimization operations to determine the parameter values included in the parameter value matrix 142.

As shown, the metric definition list 124 includes, without limitation, any number of design metrics 230(1)-230(D), where D may be any positive integer. Each of the design metrics 230 represent any type of information associated with the automobile. For instance, in some embodiments the design metrics 230 include, without limitation, structural metrics (e.g., mass), performance-related metrics (e.g., driving dynamics), and program management metrics (e.g., cost, part availability, manufacturing time, etc.). Each of the design metrics 230 includes, without limitation, a metric name 232 and a metric definition 234. The metric name 232($x$) uniquely identifies the design metric 230($x$). The metric definition 234($x$) describe the design metric 230($x$) in any technically feasible fashion based on any amount and type of data associated with designs generated by the automobile modeling subsystem 150. For instance, in some embodiments, the metric definition 234($x$) may be specified using any combination of equations, executable software applications (e.g., a cost engine, a multi-physics analysis engine, the simulation tools 170, etc.), scripts written in a scripting language, and so forth.

As described previously in conjunction with FIG. 1, each of the design metric 230 may be associated with any number and type of design goals and/or constraints in any technically feasible fashion. Further, each of the design metrics 230 may be defined based on any number of other design metrics 230 and/or constituent metrics. For explanatory purposes only, FIG. 2 depicts exemplary values for the design metrics 230(1)-230(4) and 230(D) in italics. The design metric 230(1) has the metric name 232(1) "mass" and the metric definition 234(1) is specified as a single measurement. The design metric 230(2) has the metric name 232(2) "driving performance" and the metric definition 234(1) is specified as a function of local stiffness and local stress measurements. The design metric 230(3) has the metric name 232(3) "driving dynamics" and the metric definition 234(3) is specified as a function of mass and global displacement measurements. The design metric 230(4) has the metric name 232(4) "noise, vibration, and harshness ("NVH")" and the metric definition 234(4) is specified as a function of mass and global stress measurements. The design metric 230(D) has the metric name 232(5) "crash performance" and the metric definition 234(D) is specified as a function of crash simulation measurements.

The optimization type list 126 includes, without limitation, optimization types 240(1)-240(D). In general, the number of design metrics 230 included in the metric definition list 124 are equal to the number of optimization types 240 included in the optimization type list 126. Further, the optimization type 240($x$) is associated with the design metric 230($x$). More precisely, the optimization type 240($x$) specifies how the optimization engine 140 is to optimize the design metric 230($x$). The optimization type 240($x$) may specify a goal for the design metric 230($x$) in any technically feasible fashion. For instance, in some embodiments, each of the optimization types 240 is equal to minimize, maximize, pass/fail, minimize within range, or maximize within range.

For explanatory purposes only, FIG. 2 depicts exemplary values for the optimization types 240(1)-240(4) and 240(D) in italics. The optimization type 240(1) specifies that the "mass" design metric 230(1) is to be maximized. The optimization type 240(2) specifies that the "driving performance" design metric 230(2) is to be minimized. The optimization type 240(3) specifies that the "driving dynamics" design metric 230(3) is to be minimized. The optimization type 240(4) specifies that the "NVH" design metric 230(4) is to be minimized. The optimization type 240(D) specifies that the "crash performance" design metric 230(D) is to be maximized with a specified range.

In alternate embodiments, each of the optimization types 240 may specify any optimization criteria based on any number of the design metrics 230 and/or constituent metrics in any technically feasible fashion that is consistent with the optimization algorithm(s) implemented in the optimization engine 140. In such embodiments, the number of the optimization types 240 included in the optimization type list 126 is not necessarily equal to the number of the design metrics 230 included in the metric definition list 124.

Exploring the Optimized Design Space

Figure 3:
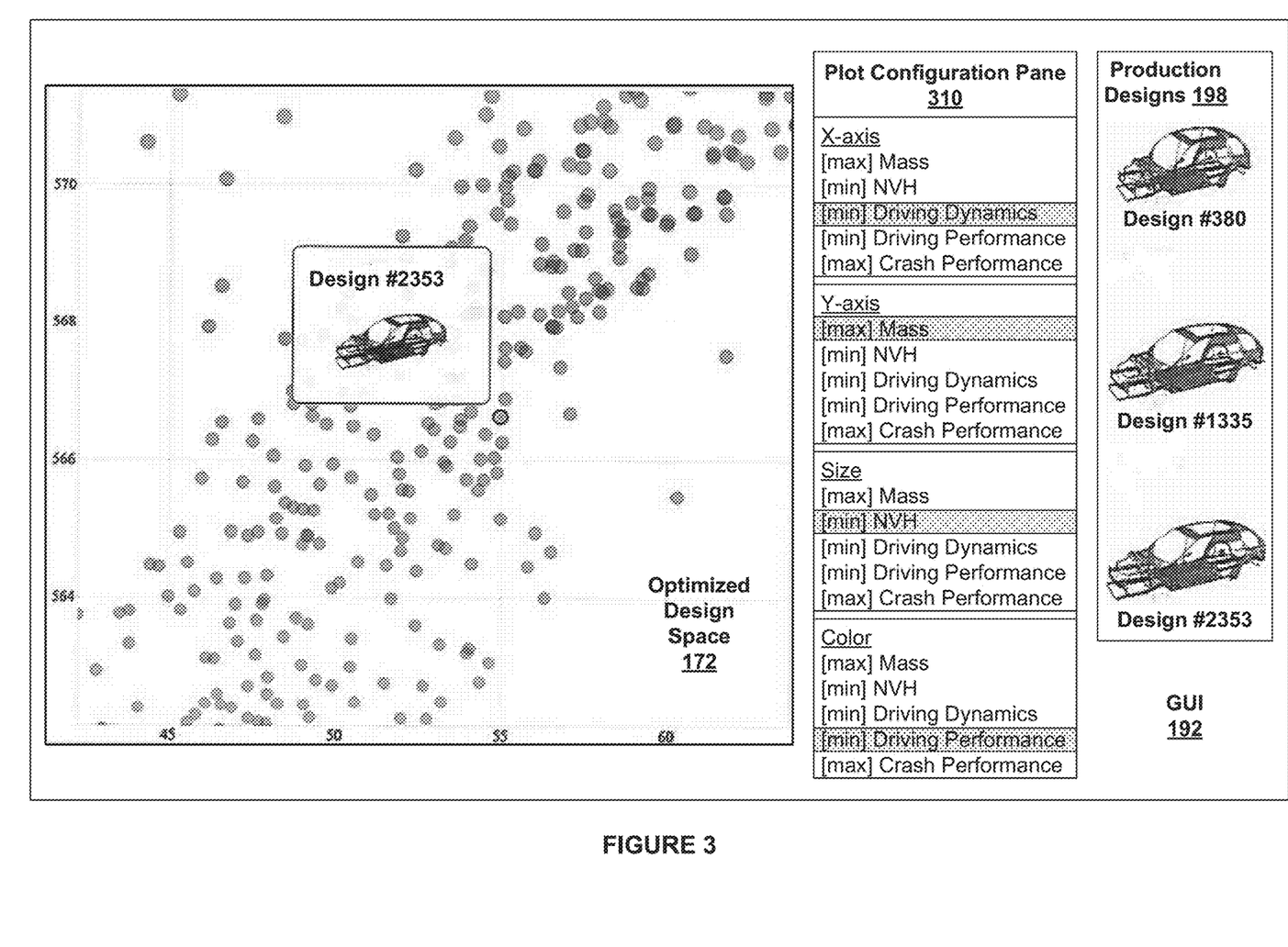
FIG. 3 illustrates an example of the graphical user interface ("GUI") of FIG. 1, according to various embodiments of the present invention.

FIG. 3 illustrates an example of the GUI 192 of FIG. 1, according to various embodiments of the present invention. As shown, the GUI 192 includes, without limitation, a plot of the optimized design space 172, a plot configuration pane 310, and thumbnails of designs from the optimized design space 172 that are selected as the production designs 198. The exploration engine 180 represents each design included in the optimized design space 172 as a different dot in the depicted plot.

The plot configuration pane 310 depicts the design metrics 230 that are selected to be represented via the X-axis, the Y-axis, size, and color of the plot. As shown, for a particular design, the location of the corresponding dot along the X-axis represents the value of the driving dynamics design metric 230(3). The location of the corresponding dot along the Y-axis represents the value of the mass design metric 230(1). The size of the corresponding dot represents the value of the NVH design metric 230(4). The color of the corresponding dot represents the value of the driving performance design metric 230(2). Notably, the plot configuration pane 310 also specifies the optimization type 240 for each of the design metrics 230 in square brackets. More specifically, "[min]" corresponds to the optimization type 240 of minimize, and "[max]" corresponds to the optimization type 240 of maximize.

In alternate embodiments, the evaluation engine 170 and/or the exploration engine 180 may store, compute, and/or display any type of data in any technically feasible fashion. For instance, in some embodiments, the evaluation engine 160 computes the values for "local stress" and "local stiffness" constituent metrics for each of the designs included in the optimized design space 172 when computing the values for the driving performance design metric 230(2). The evaluation engine 160 stores the values for the constituent metrics as part of the optimized design space 172. Subsequently, the exploration engine 180 is configured to display values for the local stress constituent metric and the local stiffness constituent metric along, respectively, the X-axis and the Y-axis of the plot.

In various embodiments, the exploration engine 180 may determine the values for any type of data, such as cost or part availability, based on the automobile modeling subsystem 150 and the parameter value matrix 142. More specifically, the exploration engine 180 may regenerate any number of the designs included in the optimized design space 172 based on the associated sets of parameter values included in the parameter value matrix 142. As part of regenerating the designs, the exploration engine 180 may collaborate with the automobile modeling subsystem 150 to compute any amount and type of additional data that is subsequently used to explore the optimized design space 172.

As shown, based on the plot of the optimized design space 172, the designer selects three of the designs included in the optimized design space 172 as the production design(s) 198. For each of the production designs 198, the GUI 192 displays a thumbnail of the CAD geometry (not shown in FIG. 3) that is stored in the optimized design space 172. In alternate embodiments, the exploration engine 180 may facilitate the selection of the production design(s) 198 from the optimized design space 172 based on any number of the design metrics 230 and, optionally, any amount and type of additional information in any technically feasible fashion.

Figure 4:
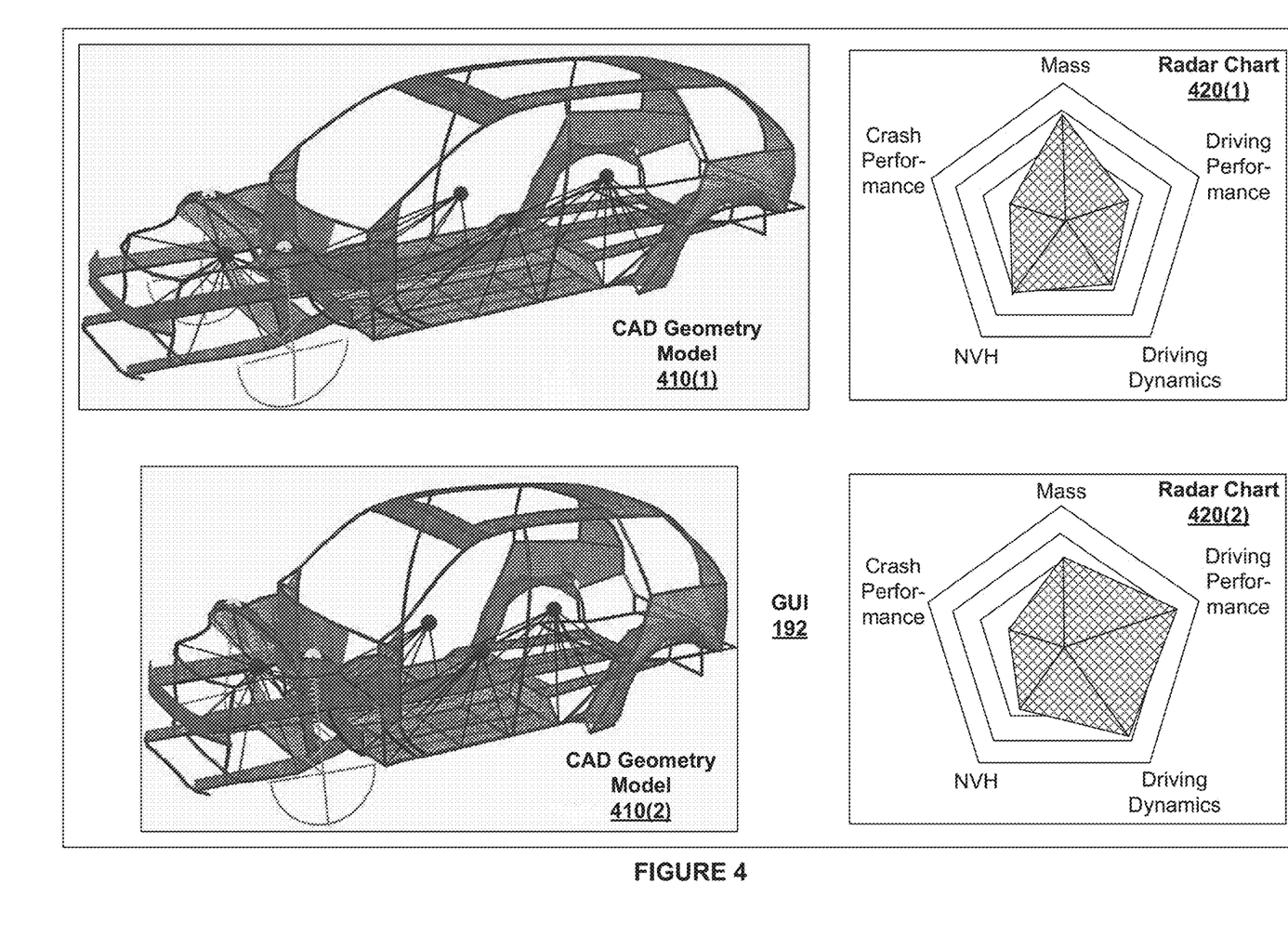
FIG. 4 illustrates another example of the GUI of FIG. 1, according to other various embodiments of the present invention.

FIG. 4 illustrates another example of the GUI 192 of FIG. 1, according to other various embodiments of the present invention. As shown, the GUI 192 depicts, without limitation, a CAD geometry model 410(1) and a radar chart 420(1) that are associated with a first design in the optimized design space 172, and the CAD geometry model 410(2) and the associated radar chart 420(2) that are associated with a second design in the optimized design space 172. As illustrated by the CAD geometry models 410(1) and 410(2), the wheelbase of the first design is significantly longer than the wheelbase of the second design.

Each of the radar charts 420 includes, without limitation, five spokes corresponding to the design metrics 420(1)-420(4) and 420(D) of FIG. 2 (mass, driving performance, driving dynamics, NVH, and crash performance). Within the radar chart 420(x), the shaded portion of each spoke is proportional to the metric value of the corresponding design metric 230 for the design represented by the CAD geometry model 410(xx). Accordingly, each of the radar charts 420 visually depicts the relative metric values of the design metrics 420(1)-420(4) and 420(D) for the associated design. And, together, the radar charts 420(1) and 420(2) visually depict differences between the first design and the second design with respect to the design metrics 420(1)-420(4) and 420(D)

More precisely, the radar charts 420 indicate that the first design has a higher value for the mass design metric 420(1), a lower value for the driving performance metric 420(2), a lower value for the driving dynamics metric 420(3), a higher value for the NVH design metric 420(4), and an equivalent value for the crash performance metric 420(D) relative to the second design. In alternate embodiments, the exploration engine 180 may configure the GUI 192 to display any amount and type of information relevant to the exploration of the optimized design space 172 in any technically feasible fashion.

Figure 5:
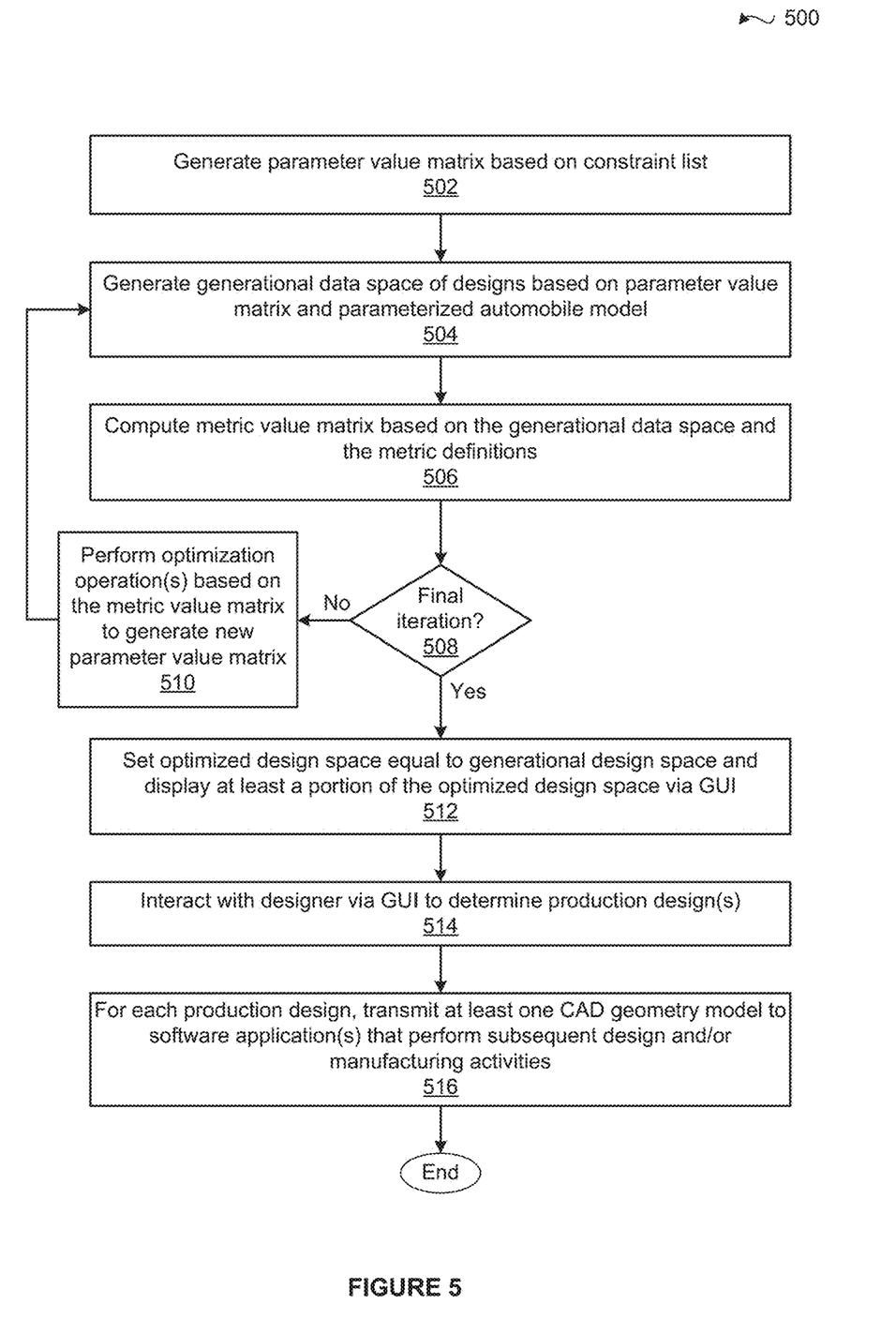
FIG. 5 is a flow diagram of method steps for automatically generating and evaluating automotive designs, according to various embodiments of the present invention.

FIG. 5 is a flow diagram of method steps for automatically generating and evaluating automotive designs, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the optimization engine 140 generates the parameter value matrix 142 based on the constraint list 122. At step 504, the automobile modeling subsystem 150 generates the generation design space 154 based on the parameter value matrix 152 and the parameterized automobile model 152. At step 506, the evaluation engine 160 computes the metric value matrix 162 based on the generational design space 154 and the metric definition list 124. At step 508, the evaluation engine 160 determines whether the current iteration is the final iteration based on any number and type of termination criteria. If, at step 508, the evaluation engine 160 determines that the current iteration is not the final iteration, then the method 500 proceeds to step 510.

At step 510, the optimization engine 140 performs one or more optimization operations based on the metric value matrix 162, the parameter value matrix 142, and the optimization type list 126 to generate a new parameter value matrix 142. The method 500 then returns to step 504, where the automobile modeling subsystem 10 generates a new generational design space 154 based on the new parameter value matrix 142 and the parameterized automobile model 162.

If, however, at step 508, the evaluation engine 160 determines that the current iteration is the final iteration, then the method 500 proceeds directly to step 512. At step 512, the evaluation engine 160 sets the optimized design space 172 equal to the generational design space 154, and the exploration engine 180 displays at least a portion of the optimized design space 172 via the GUI 192. At step 514, the exploration engine 180 interacts with a designer via the GUI 192 to determine the production design(s) 198 from the designs included in the optimized design space 172. At step 516, for each of the production designs 198(s), the exploration engine 180 transmits a least one CAD geometry model 410 representing the production design 198 to any number of software applications that perform subsequent design and/or manufacturing activities based on the production design(s) 198. The exploration engine 180 and/or the generative design application 130 may also transmit any number of representations, amount and type of design data, and amount and type of additional data associated with the production design(s) 198 to software application(s) for further design and/or manufacturing activities. The method 500 then terminates In sum, the disclosed techniques may be used to automatically generate optimized designs for an automobile. In one embodiment, a generative design application acquires a goal dataset that specifies a constraint list and any number and type of design goals. Each design goal specifies a different design metric and is associated with an optimization type (e.g., minimize, maximize, etc). The generative design application includes, without limitation, an optimization engine, an automobile modeling subsystem, an evaluation engine, and an exploration engine. In general, the generative design application implements an iterative, multi-objective, generative design process to generate an optimized design space.

Initially, the generative design application generates a parameter value matrix based on the constraint list. The parameter value matrix specifies multiple sets of parameter values. Each set of parameter values specifies the values for a set of parameters associated with a parameterized model of an automobile. For each set of parameter values, the car modeling subsystem generates a different design and then stores the design in a generational design space. As part of generating each design, the automobile modeling subsystem generates representations for the design (e.g., a CAD geometry model, a simulation mesh, etc) that are required to compute values for the design metrics. The evaluation engine performs any number of evaluations operations, such as simulations, on the designs included in the generational design space to generate a metric value matrix. For each design in the generational design space, the metric value matrix includes a different set for metric values for the set of design metrics. The evaluation engine then determines whether the current iteration is the final iteration based whether on any number of termination criteria.

If the evaluation engine determines that the current iteration is not the final iteration, then the evaluation engine transmits the metric value matrix to the optimization engine. The optimization engine implements a multi-objective optimization algorithm to generate a new parameter value matrix based on the current parameter value matrix, the corresponding metric value matrix, and the optimization types associated with the design metrics. The automobile modeling subsystem then generates a new generational design space based on the new parameter value matrix. Subsequently, the evaluation engine computes a new metric value matrix based on the designs in the new generational design space. In this fashion, the generative design application iteratively optimizes the quality of the designs in the generational design space based on the design goals. If the current iteration is the final iteration, then the evaluation engine transmits the generational design space and the metric value matrix to the exploration engine as the optimized design space. The exploration engine facilitates the exploration of the optimized design space and selection of design(s) within the optimized design space as production design(s) based on the design metrics.

At least one technical advantage of the disclosed techniques relative to the prior art is that the generative design application automatically and efficiently generates the optimized design space based on the goal dataset. Because less time and effort and required to generate and evaluate designs relative to more manual prior art approaches, the generative design application can explore a far greater overall design space within the time frames typically budgeted for automotive design phases. Accordingly, the likelihood that resulting production designs are properly optimized is increased. Further, the confidence that significantly better design options were not inadvertently overlooked is increased. These technical advantages represent one or more technological advancements over prior art approaches.

1. In some embodiments, a computer-implemented method for generating and evaluating automotive designs comprises computing a first plurality of metric values based on a plurality of metrics associated with one or more design goals and a first plurality of parameter values for a parameterized automobile model; performing one or more optimization operations on the first plurality of parameter values based on the first plurality of metric values to generate a second plurality of parameter values; and generating at least one design based on the second plurality of parameter values that is more convergent with respect to at least one of the design goals than a previously generated design.

2. The computer-implemented method of clause 1, wherein computing the first plurality of metric values comprises generating a first computer-aided design (CAD) geometry model based on the first plurality of parameter values and the parameterized automobile model; and for each metric included in the plurality of metrics, computing a metric value for the metric based on the first CAD geometry model.

3. The computer-implemented method of clauses 1 or 2, wherein performing the one or more optimization operations comprises executing a metaheuristic search algorithm based on the first plurality of parameter values, the first plurality of metric values, and one or more optimization types associated with the one or more design goals to generate the second plurality of parameter values.

4. The computer-implemented method of any of clauses 1-3, wherein a first optimization type included in the one or more optimization types specifies at least one of minimize, maximize, a target range, and a Boolean associated with a pass/fail condition.

5. The computer implemented method of any of clauses 1-4, wherein a first design goal included in the one or more design goals is associated with at least one of performance, body design, chassis design, interior design, exterior styling, aerodynamics, crash criteria, manufacturability, and cost.

6. The computer-implemented method of any of clauses 1-5, wherein a first metric included in the plurality of metrics comprises a structural metric, a performance-related metric, or a program management metric.

7. The computer-implemented method of any of clauses 1-6, further comprising computing a second plurality of metric values based on the plurality of metrics and the second plurality of parameter values; and displaying at least one of the metric values included in the second plurality of metric values to a user via a graphical user interface to facilitate an exploration of a design space that includes the at least one design.

8. The computer-implemented method of any of clauses 1-7, further comprising performing one or more filtering operations on a design space that includes the at least one design based on at least one of the metrics included in the plurality of metrics.

9. The computer-implemented method of any of clauses 1-8, further comprising computing a second plurality of metric values based on the plurality of metrics and the second plurality of parameter values; generating a plot of a plurality of designs that includes the at least one design based on the second plurality of metric values; and displaying the plot to a user via a graphics user interface to facilitate an exploration of a design space that includes the plurality of designs.

10. The computer-implemented method of any of clauses 1-9, wherein a first parameter value included in the second plurality of parameter values is associated with a first instance of a first parameterized automobile component, and a second parameter value included in the second plurality of parameter values is associated with a sub-instance of the first instance.

11. In some embodiments, one or more non-transitory computer readable media include instructions that, when executed by one or more processors, cause the one or more processors to generate and evaluate automotive designs by performing the steps of computing a first plurality of metric values based on a plurality of metrics associated with one or more design goals and a first plurality of parameter values for a parameterized automobile model; performing one or more optimization operations on the first plurality of parameter values based on the first plurality of metric values to generate a second plurality of parameter values; and generating at least one design based on the second plurality of parameter values that is more convergent with respect to at least one of the design goals than a previously generated design.

12. The one or more non-transitory computer readable media of clause 11, wherein computing the first plurality of metric values comprises generating a first computer-aided design (CAD) geometry model based on the first plurality of parameter values and the parameterized automobile model; and for each metric included in the plurality of metrics, computing a metric value for the metric based on the first CAD geometry model.

13. The one or more non-transitory computer readable media of clauses 11 or 12, wherein performing the one or more optimization operations comprises executing a multi-objective non-dominated sorting genetic algorithm based on the first plurality of parameter values, the first plurality of metric values, and one or more optimization types associated with the one or more design goals to generate the second plurality of parameter values.

14. The one or more non-transitory computer readable media of any of clauses 11-13, wherein a first optimization type included in the one or more optimization types specifies at least one of minimize, maximize, a target range, and a Boolean associated with a pass/fail condition.

15. The one or more non-transitory computer readable media of any of clauses 11-14, wherein a first design goal included in the one or more design goals is associated with at least one of performance, body design, chassis design, interior design, exterior styling, aerodynamics, crash criteria, manufacturability, and cost.

16. The one or more non-transitory computer readable media of any of clauses 11-15, wherein a first metric included in the plurality of metrics comprises a driving performance metric; a driving dynamics metric; a noise, vibration, and harshness metric; a crash performance metric; or a weight.

17. The one or more non-transitory computer readable media of any of clauses 11-16, further comprising computing a second plurality of metric values based on the plurality of metrics and the second plurality of parameter values; and displaying a CAD geometry model of the at least one design and at least one of the metric values included in the second plurality of metric values to a user via a graphical user interface to facilitate an exploration of a design space that includes the at least one design.

18. The one or more non-transitory computer readable media of any of clauses 11-17, further comprising performing one or more filtering operations on a design space that includes the at least one design based on at least one of the metrics included in the plurality of metrics.

19. The one or more non-transitory computer readable media of any of clauses 11-18, further comprising computing a second plurality of metric values based on the plurality of metrics and the second plurality of parameter values; generating a plot of a plurality of designs that includes the at least one design based on the second plurality of metric values; and displaying the plot to a user via a graphics user interface to facilitate an exploration of a design space that includes the plurality of designs.

20. In some embodiments, a system comprises one or more memories storing instructions; and one or more processors that are coupled to the one or more memories and, when executing the instructions, are configured to compute a first plurality of metric values based on a plurality of metrics associated with one or more design goals and a first plurality of parameter values for a parameterized automobile model; perform one or more optimization operations on the first plurality of parameter values based on the first plurality of metric values to generate a second plurality of parameter values; and generate at least one design based on the second plurality of parameter values that is more convergent with respect to at least one of the design goals than a previously generated design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating and evaluating automotive designs, comprising:
   computing a first plurality of metric values based on:
      a plurality of metrics associated with one or more design goals in a goal dataset defining aspects of an automotive design, and
      a first plurality of parameter values for a parameterized automobile model that is associated with at least one previously-generated design and the goal dataset;
   performing, based on the first plurality of metrics values, one or more optimization operations on the first plurality of parameter values to generate a second plurality of parameter values;
   generating, based on the second plurality of parameter values, a plurality of production designs, wherein at least one design in the plurality of production designs is convergent with respect to at least one of the one or more design goals than the previously-generated design; and
   displaying a design space that includes least a first subset of the plurality of production designs.

2. The computer-implemented method of claim 1, wherein computing the first plurality of metric values comprises:
   generating a first computer-aided design (CAD) geometry model based on the first plurality of parameter values and the parameterized automobile model; and
   for each metric included in the plurality of metrics, computing, based on the first CAD geometry model, a metric value for the metric.

3. The computer-implemented method of claim 1, wherein performing the one or more optimization operations comprises executing a metaheuristic search algorithm based on:
   the first plurality of parameter values,
   the first plurality of metric values, and
   one or more optimization types associated with the one or more design goals.

4. The computer-implemented method of claim 3, wherein a first optimization type included in the one or more optimization types specifies at least one of: minimize, maximize, a target range, or a Boolean associated with a pass/fail condition.

5. The computer-implemented method of claim 1, wherein a first design goal included in the one or more design goals is associated with at least one of performance, body design, chassis design, interior design, exterior styling, aerodynamics, crash criteria, manufacturability, or cost.

6. The computer-implemented method of claim 1, wherein a first metric included in the plurality of metrics comprises a structural metric, a performance-related metric, or a program management metric.

7. The computer-implemented method of claim 1, further comprising:
   computing a second plurality of metric values based on the plurality of metrics and the second plurality of parameter values; and
   displaying at least one of the metric values included in the second plurality of metric values to a user via a graphical user interface to facilitate an exploration of a design space that includes the at least one design.

8. The computer-implemented method of claim 1, further comprising performing one or more filtering operations on the design space to display a second subset of production designs that is smaller than the first subset of the plurality of production designs.

9. The computer-implemented method of claim 1, further comprising:
   computing a second plurality of metric values based on (i) the plurality of metrics, and (ii) the second plurality of parameter values;
   generating a plot of a second plurality of production designs that includes at least one design based on the second plurality of metric values, wherein each point in the plot is based on three or more metric values included in the first plurality of metric values or the second plurality of metric values; and
   displaying the plot to a user via a graphics user interface to facilitate an exploration of a design space that includes the second plurality of production designs.

10. The computer-implemented method of claim 1, wherein a first parameter value included in the second plurality of parameter values is associated with a first instance of a first parameterized automobile component, and a second parameter value included in the second plurality of parameter values is associated with a sub-instance of the first instance.

11. One or more non-transitory computer readable media including instructions that, when executed by one or more processors, cause the one or more processors to generate and evaluate automotive designs by performing the steps of:
   computing a first plurality of metric values based on:
      a plurality of metrics associated with one or more design goals in a goal dataset defining aspects of an automotive design, and
      a first plurality of parameter values for a parameterized automobile model that is associated with at least one previously-generated design and the goal dataset;
   performing, based on the first plurality of metrics values, one or more optimization operations on the first plurality of parameter values to generate a second plurality of parameter values;

generating, based on the second plurality of parameter values, a plurality of production designs, wherein at least one design in the plurality of production designs is convergent with respect to at least one of the one or more design goals than the previously-generated design; and displaying a design space that includes least a first subset of the plurality of production designs.

12. The one or more non-transitory computer readable media of claim 11, wherein computing the first plurality of metric values comprises:

generating a first computer-aided design (CAD) geometry model based on the first plurality of parameter values and the parameterized automobile model; and for each metric included in the plurality of metrics, computing, based on the first CAD geometry model, a metric value for the metric.

13. The one or more non-transitory computer readable media of claim 11, wherein performing the one or more optimization operations comprises executing a multi-objective non-dominated sorting genetic algorithm based on:

the first plurality of parameter values, the first plurality of metric values, and one or more optimization types associated with the one or more design goals.

14. The one or more non-transitory computer readable media of claim 13, wherein a first optimization type included in the one or more optimization types specifies at least one of minimize, maximize, a target range, or a Boolean associated with a pass/fail condition.

15. The one or more non-transitory computer readable media of claim 11, wherein a first design goal included in the one or more design goals is associated with at least one of performance, body design, chassis design, interior design, exterior styling, aerodynamics, crash criteria, manufacturability, or cost.

16. The one or more non-transitory computer readable media of claim 11, wherein a first metric included in the plurality of metrics comprises:

a driving performance metric;

a driving dynamics metric;

a noise, vibration, and harshness (NVH) metric; or a crash performance metric; or a weight.

17. The one or more non-transitory computer readable media of claim 12, further comprising:

computing a second plurality of metric values based on the plurality of metrics and the second plurality of parameter values; and performing, based on the second plurality of metrics values, one or more optimization operations on the first plurality of parameter values to generate a third plurality of parameter values;

generating, based on the third plurality of parameter values, a second plurality of production designs; and displaying, to a user via a graphical user interface:

a second CAD geometry model of at least one design included in the second plurality of production designs; and at least one of the metric values included in the second plurality of metric values.

18. The one or more non-transitory computer readable media of claim 11, further comprising performing one or more filtering operations on a design space that includes the at least one design based on at least one of the metrics included in the plurality of metrics.

19. The one or more non-transitory computer readable media of claim 11, further comprising:

computing a second plurality of metric values based on (i) the plurality of metrics, and (ii) the second plurality of parameter values;

generating a plot of a second plurality of production designs that includes at least one design based on the second plurality of metric values, wherein each point in the plot is based on three or more metric values included in the first plurality of metric values or the second plurality of metric values; and displaying the plot to a user via a graphics user interface to facilitate an exploration of a design space that includes the second plurality of production designs.

20. A system, comprising:

one or more memories storing instructions; and one or more processors that are coupled to the one or more memories and, when executing the instructions, are configured to:

compute a first plurality of metric values based on:

a plurality of metrics associated with one or more design goals in a goal dataset defining aspects of an automotive design, and a first plurality of parameter values for a parameterized automobile model that is associated with at least one previously-generated design and the goal dataset;

perform, based on the first plurality of metrics values, one or more optimization operations on the first plurality of parameter values to generate a second plurality of parameter values;

generate, based on the second plurality of parameter values, a plurality of production designs, wherein at least one design in the plurality of production designs is convergent with respect to at least one of the one or more design goals than the previously-generated design; and display a design space that includes least a first subset of the plurality of production designs.

* * * * *